Aug. 17, 1937.    C. R. ANDERSON    2,090,605
DAMPER
Filed March 26, 1936
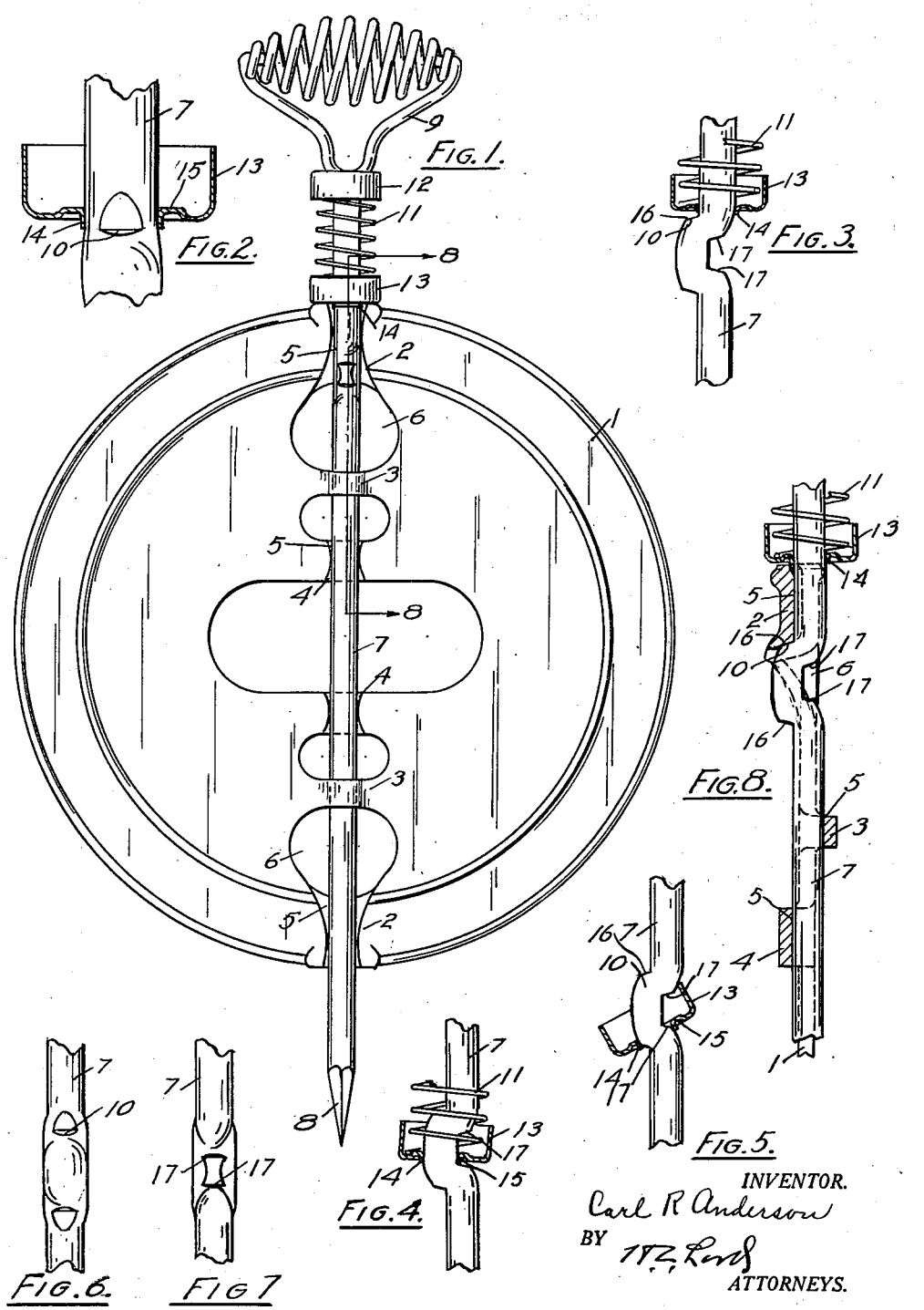
INVENTOR.
Carl R Anderson
BY
ATTORNEYS.

Patented Aug. 17, 1937

2,090,605

UNITED STATES PATENT OFFICE 2,090,605

DAMPER

Carl R. Anderson, Erie, Pa., assignor to The Griswold Manufacturing Company, Erie, Pa., a corporation of Pennsylvania Application March 26, 1936, Serial No. 71,007

2 Claims. (Cl. 126—292)

The present invention is designed to improve dampers, having the means for locking the rod to the damper, illustrated in a general way in the Massing Patent 1,146,807, patented July 20, 1915. Dampers of this type are ordinarily provided with a spring which is arranged over the damper rod and which is utilized for exerting pressure on the rod to pull the rod into locking position.

In assembling the dampers in place in the pipe which is usually done on the job, it very often happens that the spring and the accompanying washers or buttons slip off the rod and are often lost, thus interfering with the completion of the job. The present invention is designed to lock the spring normally on the rod so that the operator assembling the damper will need to pay no attention to maintaining the spring and parts on the rod as the rod is assembled. Features and details of the invention will appear from the specification and claims.

A preferred embodiment of the invention is illustrated in the accompanying drawing as follows:—

Fig. 1 shows a plan view of the damper.

Fig. 2 an enlarged section of one of the spring washers or thimbles showing its arrangement on the rod.

Fig. 3 a similar view with the rod at right angles from that of Fig. 2.

Fig. 4 a view similar to Fig. 3 but showing the thimble caught in a different locking position from that of Fig. 3.

Fig. 5 an enlarged view of the rod showing the thimble as it is manipulated for assembly.

Figs. 6 and 7, opposite views of the shoulder bend in the rod.

Fig. 8 a section on the line 8—8 in Fig. 1.

I marks the damper plate. This has a series of loops 2, 3 and 4, the loop 3 extending toward the opposite side of the damper from loops 2 and 4. These loops form a rod opening 5 through which the damper rod may be passed. The loops as shown are similar at both sides of the damper, but the invention herein is not limited to this arrangement. The opening 5 has an enlargement 6 inside of the loop 2. As shown, this enlargement is formed by an opening completely through the plate.

The damper rod 7 has the usual point 8 and is provided with a handle 9 which is welded to the end of the rod. A locking shoulder 10 is formed by a bend in the rod.

A coil spring 11 is arranged around the rod 7 and extends between the thimble 12 which abuts the handle, and the thimble 13 which abuts the plate in the assembled damper.

The rod is assembled in the plate in the same manner as disclosed in the Massing patent. The shoulder is turned toward the open side of the opening 5, passing through the loop 2 until it reaches the enlargement 6, when it is turned a half turn and the spring allowed to retract the rod, drawing the shoulder into an enlarged or locking portion of the opening as it is formed in the loop 2. Thus the rod is locked with the damper plate against turning in the damper plate. It will be understood that this assembly ordinarily takes place with the damper plate arranged in the pipe and the rod extended through the wall of the pipe and through the damper plate.

In order that the spring and assembled parts may be retained on the rod the thimble 13 is provided with a flange 14. In order that this flange may have some length, a surrounding recess 15 is provided in the bottom of the thimble. This flange is so proportioned to the size of the rod that the thimble may be assembled around the bend in the manner shown in Fig. 5. The flange springs slightly to allow the passage of the thimble. The bend is ordinarily formed by press operation and the dies in this press operation form comparatively sharp shoulders 16 and 17 in the faces of the bend so that while the thimble will pass readily over the flange in one direction the edges of the flange engage the rod, particularly at the flat portions, and hold the thimble normally on the rod. This holding engagement is assisted to some extent by the fact that the spring extends into the thimble and prevents the tilting of the thimble with the spring so located. The spring takes this position naturally when the rod is held in a position to drop the spring off the rod so that with a comparatively easy assembly of the thimble in one direction reasonable assurance of holding the thimble in place on the rod is assured after it is in place.

What I claim as new is:—

1. In a damper the combination of a damper plate having a rod opening, part of the opening at least being formed by a loop, said plate having an enlargement of the opening at the side of the loop toward the center of the plate; a damper rod adapted to enter the rod opening having a shoulder formed by a bend of the rod and adapted to turn in the enlargement, the bend being adapted to engage the wall of the enlargement as the rod is retracted, said rod having a handle at one end; a coil spring surrounding the rod and exerting retracting pressure on the rod; and a washer having an axially extending flange around the washer opening, said flange forming a curved sloping entrance to the opening and terminating in a raw edge facing opposite the handle end of the thimble, said washer being movable on the rod over the shoulder toward the handle, the flange engaging the shoulder to hold the washer and spring normally on the rod.

2. In a damper the combination of a damper plate having a rod opening, part of the opening at least being formed by a loop, said plate having an enlargement of the opening at the side of the loop toward the center of the plate; a damper rod adapted to enter the rod opening having a shoulder formed by a bend of the rod and adapted to turn in the enlargement, the bend being adapted to engage the wall of the enlargement as the rod is retracted, said rod having a handle at one end; a coil spring surrounding the rod and exerting retracting pressure on the rod; and a washer having an axially extending flange around the washer opening, said flange forming a curved sloping entrance to the opening and terminating in a raw edge facing opposite the handle end of the thimble, said washer being movable on the rod over the shoulder toward the handle, the flange engaging the shoulder to hold the washer and spring normally on the rod, the washer having an annular depression at the base of the flange.

CARL R. ANDERSON.